United States Patent [19]
Dulin et al.

[11] 3,962,080
[45] June 8, 1976

[54] SODIUM SULFUR OXIDES WASTES DISPOSAL PROCESS

[75] Inventors: Jacques M. Dulin, Libertyville, Ill.; Edward C. Rosar, Lakewood, Colo.; Russell B. Bennett, Worthington; Harvey S. Rosenberg, Columbus, both of Ohio; Joseph M. Genco, Orono, Maine

[73] Assignee: Industrial Resources, Inc., Chicago, Ill.

[22] Filed: Oct. 31, 1973

[21] Appl. No.: 411,366

[52] U.S. Cl............................ 210/59; 106/DIG. 1; 162/30 K; 162/36; 210/42 R
[51] Int. Cl.².......................................... C02C 5/02
[58] Field of Search.................. 106/DIG. 1; 210/42, 210/45, 50–53, 56, 59; 162/30 R, 30 K, 36; 55/73, 89, 228

[56] References Cited
UNITED STATES PATENTS

| | | | |
|---|---|---|---|
| 2,140,850 | 12/1938 | Palmieri | 106/DIG. 1 |
| 2,750,290 | 6/1956 | Schoeffel | 210/53 |
| 3,030,222 | 4/1962 | Eichenlaub | 106/DIG. 1 |
| 3,268,443 | 8/1966 | Cann | 210/52 |
| 3,785,840 | 1/1974 | Minnick et al. | 106/DIG. 1 |

*Primary Examiner*—Charles N. Hart
*Assistant Examiner*—Peter A. Hruskoci
*Attorney, Agent, or Firm*—Jacques M. Dulin

[57] ABSTRACT

Method for disposal of water soluble sodium sulfur oxide-containing wastes resulting from industrial processes producing fly and/or bottom ash from fossil fuel utilization and waste or excess sodium sulfur oxide compounds, particularly disposal of sodium sulfite and/or sodium sulfate resulting from wet or dry sodium alkali scrubbing of tail or flue gases to reduce $SO_x$ emissions therefrom as from smelters, power plants, paper plants, glass plants and industrial boiler operations. Process involves mixing sodium sulfur oxide wastes with an alumina and silica-containing fly ash and/or bottom ash, forming an agglomerate, such as a pellet or briquette, and sintering in the range of about (1000°–2300°F). The resultant sintered particle shows lower solubility than the current standard of calcium sulfate, being $10^{-2}$ to $10^{-4}$ as soluble as the starting sodium sulfur oxides, has increased density (as high as 2.3 g/l), and reduced volume as compared to the dry fly ash or sodium sulfur oxide wastes, and fixes heavy metals. Fly ash leaching and dusting problems are substantially overcome. Sodium sulfur oxides include sodium sulfite, sulfate, bisulfite, bisulfate, thiosulfite, persulfite (pyrosulfite), thiosulfate, persulfate (pyrosulfate), and mixtures thereof. Sintered particle may be disposed of by known landfill techniques, or used as an aggregate for mulch, road beds, concrete, asphalt or the like.

38 Claims, No Drawings

SODIUM SULFUR OXIDES WASTES DISPOSAL PROCESS

FIELD

This invention relates to disposal and reduction in water solubility and leaching of sodium sulfur oxide materials and heavy metals produced as excess or waste materials in industry. This includes disposal of sodium sulfur oxide compounds as are produced, for example, from sodium alkali air pollution control processes, typically by wet or dry scrubbing of tail or flue gases with sodium alkalis or sodium sulfur oxide compounds, or as are produced in fossil fuel or nuclear power plant cooling tower blowdown wastes, or as backwash wastes from water demineralization processes. The process simultaneously reduces leach rates and permits disposal of fly and/or bottom ash containing potentially toxic, leachable quantities of heavy metals. The end-product is a useful aggregate-type product or particulate material that has reduced water solubility or leachability with respect to heavy metals, sodium cations, and sulfur oxide anions. The invention also relates to fixing sodium sulfur oxides, and leachable heavy metal cations by sintering.

BACKGROUND

Disposal of sodium sulfur oxide compounds poses a serious water pollution control problem. Sodium sulfur oxide compounds have long been produced as by-products from industrial processes, and will also result from the use of sodium alkali additives in air pollution control processes.

In preparing water for use as boiler feedwater, makeup water, or in cleaning up condenser water, nuclear reactor coolant water, spent fuel storage water, sump waste water, rad wastes, deborating units, and decontamination units, ambient or recirculating water supplies are decontaminated or demineralized to remove various components, including borates, calcium, sodium, silica, radioactive components, various anionic components including sulfite and sulfate ions and the like, since presence of these components cause problems in the operation of the boilers or in waste disposal. Ambient water supplies have normally been treated by a series of demineralizers or ion exchange resins. These resins are periodically backwashed or cleaned and result in a backwash containing large amounts of sodium sulfur oxide components normally assayed as sodium sulfate. For example, such demineralizer wastes can contain from 15–25,000 parts per million of sodium sulfate. The wastes also may contain other ionic components, heavy metals, radioactive components and the like which pose disposal problems. Typical heavy metals include iron, cobalt, copper, manganese, and radioactive components include radioactive potassium, $^{137}Cs$, and $^{131}I$.

Still another source of sodium sulfate is that contained in the blowdown from nuclear or fossil fuel fired power plant cooling towers. A 2,000 megawatt nuclear station employing cooling towers typically will produce cooling tower blowdown sludge or magma in the amount of approximately 3.4 tons per hour of 90% solids material which, prior to concentration, assays approximately 8,880 ppm of $Na^+$ and $SO_4^{-2}$ in the ratio of 1:2. The vastness of the quantity of this sludge material is evident in the fact that approximately 15 tons per megawatt are produced each year.

Far more serious is the potential for pollution from the use of sodium alkali materials, such as sodium hydroxide, sodium carbonate, sodium bicarbonate, sodium sulfite, and the like for $SO_2$ control in wet or dry scrubbing of $SO_2$ from tail or flue gases from industrial plants, smelters, paper plants, glass plants, power plants and the like which burn sulfur-containing fossil fuels such as coal or oil. The magnitude of the problem can be seen from the fact that it is estimated that from 20–35 million tons of sulfur dioxide were vented to the atmosphere in the United States in 1972 from industrial plants and power plants by burning fossil fuels containing bound sulfur.

While a principal approach to $SO_2$ control has been wet scrubbing of tail gases with lime or limestone, these processes involve several disadvantages. The energy required to pump the water through the scrubber is relatively high and the scrubbers are prone to scale formation. Normally, there must be recycle of unreacted alkaline calcium compounds and the liquid/gas ratio must be relatively high. The inverse solubility and scaling problems lead to high capital and operating costs due to complex piping, demisters, surface contact areas and the like.

Still further, the calcium scrubber sludge containing calcium sulfite and sulfate poses very expensive and serious disposal problems. Normally, it is produced at the rate of approximately one acre foot per megawatt per year. The sludge material is the "fourth" state of matter, being a thixotropic mixture of finely divided crystalline particles and water. Normally, the material contains from 40–60% water and will not settle or completely dry out at ambient conditions. Its disposal involves the cost of transporting the water; in arid areas that water is precious or unavailable. In addition, sludge cannot be piled up above ground since the pile will flow under its own weight. This has led to the use of flocculants and scrubber ponds, which are typically clay-lined ponds, or pits scooped out of clay formations. However, calcium sulfate has a tendency to break down clay and render it relatively permeable. This then permits the soluble constituents of the scrubber sludge to leach from the pond. Normally, the starting limestone contains from 10–50% magnesium carbonate which, in the scrubber $SO_2$ removal reaction, produces highly soluble (700 g/l) magnesium sulfate (epsom salt) pollutant which can leach from the pond due to calcium sulfate-induced permeability. Current calcium sulfate/sulfite sludge disposal costs are running as high as $20/ton.

In addition, the tail gas clean-up processes also collect fly ash and heavy metals which are originally present in the coal. The heavy metals, among them beryllium, boron, cadmium, strontium, magnesium, arsenic, chromium, barium, cobalt, fluorine, mercury, manganese, nickel, tin, sellenium, vanadium, lead, radioactive elements such as $^{226}Ra$, $^{228}Ra$, $^{228}Th$, $^{230}Th$, and $^{232}Th$, are present in various quantities in the coal. These are collected in the scrubber sludge and may be leached from the ponds.

To overcome the problems of using calcium in scrubbers, and the high capital and operating costs, there have been proposed both wet and dry systems for use of sodium alkaline compounds. The sodium compounds have the advantage of increased reactivity and a lower liquid to gas ratio due to the fact that both the alkalis and end-product sodium sulfur oxide compounds are highly soluble in the scrubber water. The scrubbers employing sodium alkaline compounds are less complex primarily because no substantial attention need be paid to the problem of scaling in the scrubber.

Dry sodium processes, principally involving the use of sodium bicarbonate injected as a dry powder upstream of a baghouse have been successfully tested on full-scale sized pilot baghouse operations for removal of $SO_x$ and particulates from oil and coal-fired power plants. The resultant baghouse filter cake material is a mixture of fly ash containing residual heavy metals, and the sulfur oxide compounds, principally sodium sulfite and sodium sulfate. The dry baghouse cake is periodically removed from the baghouse hoppers.

A hybrid process involves spraying a solution of sodium bicarbonate or carbonate at a rate which permits drying after reaction and collection of fly ash and sodium sulfite/sulfate in a cyclone and/or baghouse and/or electrostatic precipitator. Mixtures of molten alkali metal carbonates are used as $SO_x$ sorbents, producing Na, K, Li sulfites/sulfates.

However, while it would be of great advantage to adopt the use of sodium alkalis, either wet or dry for $SO_x$ air pollution control in order to take advantage of the increased efficiency as compared to calcium systems, the major problem is the fact that the resultant sodium wet scrubber liquor or the dry sodium sulfur oxide-containing waste material is water soluble. The net result is that utilities and industrial users are left with a water pollution problem after having solved their air pollution emissions problem. Although the wet or dry sodium alkali $SO_2$ emissions control processes are generally cheaper than calcium or MgO systems, the disposal of the resultant sodium sulfur oxide wastes has been a major barrier to the adoption of such systems as a solution to $SO_x$ and particulate emissions problems.

Therefore, there is a very great need for a process which will result in reducing the solubility of the $SO_2$ emissions control wastes or the solubility of waste sodium sulfite and sulfate from various types of industrial processes. These is also great need for a process which will simultaneously dispose of two or more of the fly or bottom ash residuals from the burning of fossil fuels such as coal or oil, potentially toxic heavy metals, or radioactive elements, which are normally present as the initial components of fossil fuels such as coal or oil or are produced in the energy-generating process (nuclear reactor power plants). There is also the need for a process which will reduce the leaching or result in the fixing or partial fixing of heavy metals, radioactive elements, and sodium sulfur oxide components permitting the thus-fixed product to be cheaply disposed of, by landfill or useful as an aggregate product (where radioactivity is nil or low).

THE INVENTION

OBJECTS

It is an object of this invention to provide a process for reducing the solubility of Na, K, Li sulfur oxide compounds, particularly those of sodium.

It is another object of this invention to provide a process for reducing the water solubility of sodium sulfur oxide compounds produced in $SO_2$ emissions control processes.

It is another object of this invention to provide a process for simultaneously fixing potentially toxic heavy metals and thereby reduce their leachability, as well as to reduce the solubility of sodium sulfur oxide compounds which are produced in a variety of industrial processes.

It is another object to reduce the dusting and leaching problem inherent in fly and/or bottom ash disposal.

It is another object of this invention to provide a process for simultaneously disposing of excess and waste fly and/or bottom ash produced from burning fossil fuels such as coal or oil as well as sodium sulfur oxide wastes, such as would result from sodium alkali scrubbing of flue gases or tail gases, in a variety of industrial or power plant operations.

It is another object of this invention to provide a sintered type of particulate product which can be used as an aggregate, such as a mulch or in road bed fill or concrete or asphalt filler material.

It is another object of this invention to provide a process for sintering a mixture of sodium sulfur oxide-containing waste materials with a silica and alumina containing material and thereby reduce the solubility of the sodium sulfur oxide compounds, permitting them to be simply disposed of or used as aggregate.

It is another object of this invention to fix radioactive elements normally present in coal or oil fossil fuels or are recovered from rad waste clean-up in energy generating or other processes, by sintering with ash and sulfur oxide-containing wastes, such as demineralizer or blowdown magma.

Still other objects will be evident from the description which follows.

SUMMARY

Alkali metal sulfur oxide compounds are mixed with fly ash, formed into an agglomerate particle, and sintered at temperatures ranging from 1000°–2300°F for a period of time, dependent principally on the specific heat of the mixture, which temperature does not cause substantial degassing of $SO_x$ ($SO_2$, $SO_3$), and which time is sufficient to provide a unitary sintered mass that exhibits reduced water solubility of the alkali metal sulfur oxide compounds. Sodium sulfur oxides are exemplary of the class.

The sintering may take place under oxidizing or slightly reducing conditions, at sub- or super-atmospheric pressure, although ambient oxidizing and atmospheric pressure conditions are preferred. The sintering heat cycle may represent continuous heat up to peak temperature and cool down, or the particle may be held for substantial time periods at a preferred temperature before cooling. Heating times may range from 0.1 hour to 12 hours. The agglomerate may be a pellet containing a binder, may be self-bound as with water, or may be briquetted under pressure.

Sulfite tends to degas as $SO_x$ ($SO_2$, $SO_3$) in relation to temperature, with a greater percentage of sulfite being permissable at lower sintering temperatures. For high temperature sintering (above about 1600°F), the sodium sulfur oxide compound should be in, or converted to, the sulfate form during or prior to sintering, to reduce or prevent $SO_x$ evolution from the particle during sintering. At lower (medium) temperatures (about 1200°–1600°F) some sulfite can be permitted, and at low temperatures (about 900°–1200°F) substantial or all sulfite cake may be employed. Similarly, sulfate, when in high quantities in the mixture, may partially degas as $SO_x$ at temperatures above about 1800°F. Within the range of 1000°–2300°F, we prefer the range of about 1200°–1500°F for insolublization by sintering of mixtures containing substantial quantities of sulfites, and about 1200°–1800°F for insolubilization by sintering of mixtures containing substantial quantities of sulfates. Most preferred is the range of 1400°–1800°F.

The agglomerate also results in reducing the dusting and leaching problems inherent in fly and/or bottom ash by the partial melting and matrix formation with the sodium sulfur oxide cake components.

The end-product shows reduced solubility, e.g., by a factor of $10^2$ to $10^4$ times, of the sodium sulfur oxide compounds, fixing of heavy metal or radioactive components in the ash, reduced volume and increased density. The particle is suitable for use as such as an aggregate, e.g., as a mulch or road bed fill, or used as an aggregate in a composition such as in concrete, a pozzolan, asphalt, ceramics (bricks), or the like.

DETAILED DESCRIPTION

The detailed description which follows is by way of example and not by way of limitation of the scope of the invention. Particular reference will be had to sodium sulfate and sulfite mixtures resulting from $SO_x$ emissions control processes. Thus, reference to sodium should be understood to include potassium and lithium as well, where relevant.

It should be understood, however, that the process which produces the sodium sulfur oxide compound is not critical to the process of this invention. Thus, the detailed descriptions herein of a $SO_x$ emissions control process as a dry process involving reaction of $SO_x$ with Nahcolite Ore as the sorbent are examplary only. One process comprises passing a flue-type hot gas (330°F) containing $SO_x$ pollutant through a fluidized bed of a sodium bicarbonate type material (raw Nahcolite Ore). Alternately, the Nahcolite Ore may be injected in the flue gas ahead of a fabric filter, or an electrical or mechanical collection device, such as a cyclone or electrostatic, precipitator or apitron. The resulting reacted bed, baghouse, or otherwise collected material, herein called a cake whether it be from a wet or dry $SO_x$ emissions control process, is a mixture of fly ash and sodium sulfur oxide compounds. The precise composition of the cake compounds varies, depending inter alia, on the amount of $SO_x$ in the flue gas, the type of fuel, the type of firing equipment (boiler type) and its operation, the type of $SO_x$ emissions control equipment, its conditions and operations, and on the sodium alkali sorbent. However, the examples herein are representative of the range of various types of fossil fuels and power plants.

It should be understood that the $SO_x$ control process described herein is representative of wet as well as dry processes, it being understood that in wet scrubbing, the resultant liquor may be dried before being processed by the sintering method described herein. In the alternative, the sodium wet scrubber liquor can be concentrated, and the moisture content of the liquor can be used to agglomerate the added fly and/or bottom ash materials prior to sintering.

The precise sodium alkali used in the given $SO_2$ emissisons control process is likewise not critical and may involve, among others, wet or dry scrubbing with sodium hydroxide, sodium carbonate, sodium bicarbonate, raw or crude calcined Nahcolite Ore, Trona, soda ash of various grades, sodium sulfite/bisulfite as in the Wellman-Lord process, and molten alkali metal carbonates mixtures.

Likewise, the process is applicable to sodium sulfur oxide wastes from other types of industrial processes, and is not limited to flue gas or tail gas clean-up from power plants, smelters, paper plants, glass plants and the like. More specifically, the process can be applied to the disposal of sodium sulfur oxide sludges or waste waters from paper-making processes and cooling tower blowdown or demineralizer backwash liquors from nuclear or fossil fuel fired power plants. In such cases where ash is not present in the waste, the ash is added as required.

For simplicity, the sodium sulfur oxide compounds which are produced by the industrial processes as wastes or as wastes from $SO_x$ emissions control are herein called sulfate wastes or sulfate cake. It should be understood that the principal components mixture is one of sodium sulfite and sulfate, although more complex mixtures such as from the sulfite/bisulfite process include sodium sulfite, sodium bisulfite, sodium sulfate, sodium bisulfate, and, it is believed, sodium thiosulfate. In processes using other alkali metal sorbents, their sulfur oxides are produced.

Depending on the sintering temperature as above noted, where a substantial portion of the "sulfate cake" is in the sulfite form, the sulfite may be oxidized to sulfate prior to, or during sintering to reduce degassing at high sintering temperatures.

When the sodium sulfur oxide wastes are in a scrubber liquor or other waste liquor, or sludge, e.g., an aqueous solution or sludge of about 10 weight percent water or more, the sulfite may be oxidized to sulfate according to the reaction:

1. $Na_2SO_3 + \frac{1}{2}O_2 \rightarrow Na_2SO_4$, by sparging with air or oxygen, preferably at neutral or acidic pH's (pH 2–8), at ambient or elevated temperatures (0°–200°C). The oxidation proceeds easily and substantially quantitatively under such conditions. A metal sulfate, such as Co or Cu sulfate, in ppm quantities may be used as catalyst.

Where the sulfate cake is a dry cake or moist sludge (less than about 10 weight % water), the sulfite in the cake or sludge may be converted, wet or dry, to sulfate. The cake or sludge may be dissolved or slurried in water and sparged as above. The dried cake or sludge, being typically in a finely divided powder form may be fluidized with air or oxygen at ambient or elevated temperature (0°–300°C) for a time sufficient to effect the oxidation, which time is principally dependent on the particle size, percent sulfite, percent oxygen in the fluidizing gas, and fluidizing gas temperature, and which would normally be in the range of from about 5 minutes to 10 hours. A convenient method of "fluidization" can occur during conveying of the cake powder or dust to the pelleting operation. For example, where baghouse, fluid bed, electrostatic precipitator, or apitron cake (dust) is "airveyored" (conveyed by pneumatic methods in ducts), the residence time in the duct may be sufficient to effect the oxidation by the conveying air or oxygen. Ageing dry cake in aerated storage, e.g., pile rotation, for 30–120 days may effect oxidative conversion to sulfate.

Another method of oxidation is use of air jets to clean the bags and/or collection hoppers of the baghouses or electrostatic precipitators. Normally, flue gases are deficient in oxygen, resulting in sulfite production in preference to sulfate formation. Thus, still another method is to improve sulfate production by bleed-in of excess air where convenient.

Oxidation can be effected during agglomeration of the cake or sludge. Where a pan pelletizer is used, it may be run under hot (50°–400°C), oxidizing conditions (ambient oxidizing atmosphere, or jets of air or oxygen directed on the pan surface). In the alternative, the binder or moisturizer may be an oxidizing or oxygen-contributing compound. For example, the cake may be pelleted with 1–10% of a 0.5–30% hydrogen peroxide solution as the agglomeration agent alone, or in conjunction with a binder. $KClO_3$, $MnO_2$ and organic oxidizing agents may be used.

Oxidation may also be effected during the sintering process. The particles, pellets or briquettes may be heated to, or held at, a specific temperature under an oxidizing atmosphere, prior to cycling through the sintering temperature. For example, pellets may be soak-heated under air or oxygen for 0.5–6 hours at 60°–400°C prior to being heated to the sintering range of 1000°–2300°F (538°–1260°C).

During sintering of mixes containing substantial quantities of sulfite, some sulfite may be evolved as $SO_2$ and $SO_3$ gas at the higher end of the temperature range. In contrast, less than 1% (0.7%) of the sulfate is evolved, for example, at a 1600°F sintering temperature. Thus, for an $SO_x$ emissions control process wherein 80% of the $SO_x$ in the flue gas is sorbed in the cake as sulfate, a net 79% could wind up in the sintered particle. Off-gases from sintering may be recycled through the $SO_x$ emissions control system to recapture a portion of the approximately 1% evolved. In addition to conversion of a portion of sulfite to sulfate, lowering the amount of sulfur oxide or increasing ash content can be employed to reduce sulfur degassing to an acceptable level.

A typical sulfate cake is produced in an $SO_x$ emissions control process as follows. A sodium bicarbonate source, such as crude or processed Nahcolite Ore, is powdered to 90% – 200 mesh and injected in the flue gas of a power plant just upstream of a baghouse. The Nahcolite Ore is carried into the baghouse and forms a filter cake on the filter fabric, typically a fiberglass fabric. In the baghouse, the Nahcolite Ore acts both as a particulates filter aid and as a reactant for combining with the $SO_x$ to form a mixed sodium sulfite/sulfate end-product. Periodically, the bags are shaken and the cake containing fly ash, and the spent Nahcolite Ore which has been converted to sodium sulfite/sulfate (and residual sodium carbonate), is collected in the hoppers below the bags.

The Nahcolite Ore referred to above is predominantly a sodium bicarbonate-containing ore having approximately 10–40% insoluble gangue material. A typical assay range would be as set forth in Table I below.

TABLE I

Representative Raw Nahcolite Ore, Run of Mine Assays

| Components | Wt % Components |
|---|---|
| A. Cold Water Solubles | |
| 1) $NaHCO_3$ | 75.0 – 85.3 |
| 2) $Cl^-$ | 0.0033 – 0.0560 |
| B. Cold Water Insolubles | |
| 1) Dolomite — $CaMg(CO_3)_2$ | 7.45 – 4.73 |
| 2) Dawsonite $NaAlCO_3(OH)_2$ | 2.65 – 1.65 |
| 3) Silica — $SiO_2$ | 2.56 – 0.59 |
| 4) Iron — Fe | 0.45 – 0.38 |
| 5) Sulfur (Organic + $FeS_2$) | 0.52 – 0.45 |
| 6) K — Feldspar and Calcite ($K_xAl_ySi_zO_{tc}$ and $CaCO_3$) | 8.98 – 5.87 |
| 7) Total Organics | 2.37 – 1.03 |
| (Organic Carbon Alone) | (1.91) – (0.83) |
| Total | 99.983  100.05 |

A typical baghouse sulfate dust cake analysis from actual runs with Nahcolite Ore for $SO_x$ emissions control from power plant burning of 1.8–2.0% sulfur oil is set forth in Table II:

TABLE II

Baghouse Dust Cake Analysis

| | | Elemental Analysis Range (11 tests, weight %) |
|---|---|---|
| pH (1:100 ml) | — | 8.15 – 8.58 |
| Sodium (Na), % | — | 20.22 – 21.88 |
| Calcium (Ca), % | — | 2.35 – 3.35 |
| Magnesium (Mg), % | — | 0.77 – 1.17 |
| Carbonate ($CO_3$), % | — | 14.60 – 33.09 |
| Sulfate ($SO_4$), % | — | 21.24 – 37.28 |
| Sulfite ($SO_3$), % | — | 0.60 – 1.18 |
| Nitrate ($NO_3$), % | — | 0.65 – 0.86 |
| Acid insoluble, % | — | 16.8 – 19.4 |

| | | Combination Analysis Range (11 tests, weight %) |
|---|---|---|
| $NaHCO_3$ | — | 7.1 – 37.5 |
| $Na_2CO_3$ | — | 0.0 – 3.6 |
| $Na_2SO_4$ | — | 28.0 – 54.6 |
| $NaHSO_4$ | — | 0.0 – 4.4 |
| $NaHSO_3$ | — | 0.8 – 1.6 |
| $NaNO_3$ | — | 0.8 – 1.0 |
| $MgCO_3$ | — | 2.5 – 4.0 |
| $CaCO_3$ | — | 5.9 – 8.4 |

Two examples representing a range of differing types of power plant operation and coal fuel sources are described in more detail below in Table III. The $SO_x$ emissions control system involving Nahcolite Ore injected upstream of a baghouse would retrofit downstream of a precleaning electrostatic precipitator. This is optional, and the electrostatic precipitator may be omitted with the baghouse collecting the fly ash as well as the spent Nahcolite Ore sulfate cake. Separation of fly ash pick-up from cake formation is typical of retrofit installation situations, and permitted determination of how much of the bottom ash, fly ash and cake each could be insolubilized by sintering. From the data below it is evident that depending on coal type and plant parameters, all the waste ash and cake can simultaneously be disposed of by sintering.

TABLE III

Plant, Ash and Wastes Parameters

| Specification | Case 1 Southwestern 800 MW | Case 2 Midwestern Two 840 MW Units |
|---|---|---|
| Coal Burned: | | |
| Sulfur, % | .7 | 3.5 |
| Ash, % | 20–30 (av~22) | 8.5 |
| Heat Value, BTU/lb | 8,997 | 10,480 |
| Moisture | 11.40 | 16.00 |
| Feed Rate, 100% Load Factor | | |

TABLE III-continued

| Specification | Plant, Ash and Wastes Parameters | |
|---|---|---|
| | Case 1 Southwestern 800 MW | Case 2 Midwestern Two 840 MW Units |
| lbs/hr | 842,000 | 816,800 |
| Plant: | | |
| Load Factor, % | 68. | 65. |
| Heat Rate, BTU/kw hr | 9,480 | 10,190 |
| Boiler | Pulverized Coal Dry Bottom | Cyclone Wet Bottom |
| Ash Distribution, Total | | |
| Bottom, % (TPY) | 20 (110,300) | 70 (138,400) |
| Fly, % (TPY) | 80 (441,400) | 30 (59,300) |
| Electrostatic Precipitator | | |
| Efficiency, % (TPY fly ash) | 97.0 (428,200) | 99.0 (58,700) |
| Flue Gas | | |
| Temperature °F | 245 | 330 |
| Volume, ACFM | $2.35 \times 10^6$ | $2.99 \times 10^6$ |
| $SO_x$, ppm | 681 | 2,893 |
| Baghouse | | |
| Efficiency, % | 99.5 | 99.5 |
| $SO_x$ Removal | 75% | 75% |
| Nahcolite Ore TPY | 189,000 | 1,151,000 |
| Sulfate Cake Recovered | 162,000 | 962,200 |
| Total Wastes (ash + cake) TPY | 713,700 | 1,159,900 |

For the two cases above described, the sulfate cake solids that would be removed from the baghouse as a result of the $SO_x$ emissions control process using 75% $NaHCO_3$ assay raw Nahcolite Ore would be approximately as shown in Table IV.

TABLE IV

| Sulfate Cake Solids Components | Cake Amounts in Plant Operation[3] | |
|---|---|---|
| | Case 1 Southwestern Plant 840 MW Unit lbs/hr | Case 2 Midwestern Plant Two 840 MW Units lbs/hr |
| Fly ash, 99.5% efficiency baghouse | 4,428 | 414 |
| *Sodium sulfate $Na_2SO_4$[1] | 18,581 | 190,343 |
| Sodium carbonate/ bicarbonate[2] | 15,842 | 47,329 |
| Unreacted Nahcolite Ore | 15,698 | 100,088 |
| Total | 54,549 | 338,174 |

*Sodium sulfite/sulfate in typical ratios as shown in Tables V and VII below.
[1],[2]Amount given represents equivalent converted all to sulfate, or carbonate as the case may be.
[3]For additional details on Case 1 and Case 2 as to the Nahcolite Ore baghouse injection method, see Dulin, J.M., Rosar, E.C., Rosenberg, H.S., Anastas, M.Y., and Genco, J.M., The Use of Nahcolite Ore and Bag Filters for $SO_2$ Emissions Control, presented before the ASME Air Pollution Control Division National Symposium on Air Pollution Control (sponsored by Philadelphia Section ASME and Air Pollution Control Assn.), April 25, 1973, the information of which is incorporated by reference herein.

The principles of this invention can be applied to smelter off-gases, for example, copper smelter operations where the flue gases have an $SO_x$ concentration in the range of about 50 ppm (acid plant tail gas) to over 200,000 ppm (roaster gas). Likewise, industrial boilers having $SO_x$ concentrations in the range described for the power plants above, can be employed. It is not necessary to employ the Nahcolite Ore in a baghouse, but it may be used upstream of an electrostatic precipitator, an apitron or the like, or in wet scrubber operation. A larger grain size may be used in a fluid bed, in a granular bed filter or the like, or still larger sizes can be used in a cross-flow horizontal or moving bed-type dry scrubber. For example, a −28 +35 mesh raw Nahcolite Ore is useful in a fluidized bed operation.

MATERIALS PREPARATION

In the tests described below, the waste powdered sulfur oxide cake material was prepared uniformly in the laboratory in order to have an equivalent base of comparison. Several batches of spent cake material were prepared as follows:

In Batch A, a mixed powdered cake material was made from reagent grade chemicals in the composition set forth in Table V below. The Southwest and Midwest locations refer to the difference in $SO_x$ sorption at the two locations utilizing the Case 1 and 2 parameters described above, and reflect differences between low sulfur coal, low temperature baghouse operation (Case 1, Southwest), and high sulfur coal, moderate temperature operation (Case II, Midwest). The sodium sulfur oxide was present as in the sulfate state, as noted above.

TABLE V

Batch A Sodium Sulfate-Containing Cake
Weight Percent in Material
Corresponding to Indicated Location

| Constituent | Case 1 Southwest | Case 2 Midwest |
|---|---|---|
| $Na_2SO_4$ | 34.06 | 56.3 |
| $Na_2CO_3$ | 33.88 | 21.5 |
| $CaCO_3$ | 6.54 | 5.85 |
| $MgCO_3$ | 2.65 | 2.47 |
| $K_2CO_3$ | 3.82 | 2.48 |
| $Al_2O_3$ | 2.89 | 2.88 |

TABLE V-continued

Batch A Sodium Sulfate-Containing Cake
Weight Percent in Material
Corresponding to Indicated Location

| Constituent | Case 1 Southwest | Case 2 Midwest |
|---|---|---|
| $Fe_2O_3$ | 0.5 | 0.31 |
| $SiO_2$ | 7.54 | 8.12 |
| Fly ash (produced at Case 1 and Case 2 locations) | 8.12 | 0.1 |
| Totals | 100.00 | 100.01 |

For Batch B the cake was prepared by reaction of raw Nahcolite Ore with $SO_x$ under the flue gas conditions. The Ore was an approximately 75% grade ($NaHCO_3 + Na_2CO_3$), which represents a typical commercial grade. This Batch B assay was as shown in Table VI for Nahcolite Ore, and Table VII for the cake. Table VII cake represents retrofit with a very high efficiency precleaning electrostatic precipitator or for very low ash oil-fired operation, while added ash in Table V cake represents lower efficiency ash precleaning. The final mixes below also represent retrofit or new installations with no ash precleaning.

TABLE VI

Chemical Composition of Raw Nahcolite for Batch B Cake

| Constituent | Weight Percent of Indicated Constituent | |
|---|---|---|
| Solubles: | | |
| $NaHCO_3$ | 75.9 | |
| $Na_2CO_3$ | 2.5 | |
| Moisture | 2.0 | |
| Subtotal | 80.4 | 80.4 |
| Insolubles (by ratio from −28 +35 batch raw Nahcolite Ore) | | |
| Organics | 5.1 | |
| Inorganics | 14.5* | 19.6 |
| Subtotal | 19.6 | Total 100.0 |
| *Insoluble Inorganics (by assay ratioed as above from insolubles of −200 mesh N.O.) | | |
| $CaCO_3$ | 5.7 | |
| $MgCO_3$ | 2.87 | |
| $SiO_2$ | 3.58 | |
| $Al_2O_3$ | 1.03 | |
| $Fe_2O_3$ | .55 | |
| $Na_2O$ | .39 | |
| $K_2O$ | .35 | |
| Subtotal | 14.47 | |

Batch B Nahcolite Ore was ground to 88.4% −200 + 325 mesh, 11.6% −50 + 200 mesh (.67% of +50 mesh gangue rejected; 30.4% −325 mesh rejected as too fine for use in fluidized bed), split into samples and converted to sulfate cake as follows: Preliminary results showed that the sulfate/sulfite ratio is substantially insensitive to $SO_x$ concentration in the gas. Case 1, gas at 245°F containing 15,800 ppm of $SO_2$, and having other constituents (mole fraction amounts in parentheses) $N_2(.7250)$, $O_2(.0388)$, $CO_2(.1250)$ and $H_2O(.0954)$ representing the Southwestern power plant conditions, was passed in a fluidized bed to convert the sodium bicarbonate to sodium sulfate and sulfite. $SO_2$ removal was achieved at a fluidization velocity of 0.19 ft/second through the bed. Case 2, the gas representing the Midwestern power plant at 330°F and having 14,800 ppm $SO_2$ was passed through the bed under the same conditions, with $N_2(.7172)$, $O_2(.0402)$, $CO_2(.1311)$ and $H_2O(.0967)$. The analyzed Batch B cake was as shown in Table VII.

TABLE VII

| Component | Batch B Cake (Fly Ash Free) Case 1 Southwest Run 1 | Run 2 | Case 2 Midwest |
|---|---|---|---|
| $Na_2CO_3 + NaHCO_3$ | 18.7 | 35.3 | 9.5 |
| $Na_2SO_3$ | 46.3 | 29.4 | 53.9 |
| $Na_2SO_4$ | 4.2 | 7.4 | 3.7 |
| Insolubles* | 29.8 | 26.9 | 31.9 |
| Moisture (est) | 1.0 | 1.0 | 1.0 |
| | 100.0 | 100.0 | 100.0 |

*$CaCO_3$, $MgCO_3$, $Fe_2O_3$, $K_2CO_3$, $Al_2O_3$, $SiO_2$, and Organics

The actual analyzed chemical compositions of ash samples from the Case 1 and Case 2 locations are set forth in Table VIII below:

TABLE VIII

Chemical Compositions of Fly Ash and Bottom Ash From Case 1 and 2 Location Power Plants
Weight Percent in Material From Indicated Location

| Constituent | Case 1, Southwest Bottom Ash | Fly Ash | Case 2, Midwest Bottom Ash* | Fly Ash* |
|---|---|---|---|---|
| $Na_2O$ | 1.28 | 1.36 | <.28 | .9 |
| $K_2O$ | 1.21 | .94 | .23 | 1.0 |
| CaO | 5.2 | 4.8 | 6.2 | 3.2 |
| MgO | 2.0 | 1.0 | 1.6 | 1.6 |
| BaO | 0.22 | 0.28 | .2 | .2 |
| SrO | 0.12 | 0.08 | .2 | .2 |
| Carbon (C) | 0.76 | 0.35 | .27 | 2.1 |
| $Fe_2O_3$ | 5.8 | 4.4 | 34.6 | 21.0 |
| Sulfur (S) | 0.03 | 0.10 | .03 | 1.3 |
| $Al_2O_3$ | 29.8 | 31. | 11.5 | 15.9 |
| Chloride (Cl) | 0.08 | <.03 | .45 | .3 |
| $SiO_2$ | 53. | 55. | 43.0 | 49.2 |
| $TiO_2$ | 1.3 | 1.2 | 1.0 | 1.6 |
| $P_2O_5$ | 0.45 | 0.40 | .3 | .5 |
| Total | 101.17 | 100.94 | 99.86 | 100.6 |

*Analysis percentages rationalized

This ash was added to either Batch A or Batch B (Cases 1 and 2) sulfate cakes to make the mixes set forth in the specific examples below. The description of sintering the mixes and leaching sintered pellets or briquettes follows the general description of agglomeration techniques applicable to this invention.

The heavy metals content of coal is also of concern. Table IX gives weighted averages of trace elements in coal from the same geologic formation used by the Southwestern power plant, Case 1 above.

TABLE IX

| Element | Coal Heavy Metals Content Amounts | |
|---|---|---|
| As | 1.1 – 1.2 | µg/gm |
| Ba | 10.0 – 11.0 | " |
| Be | 1.6 – 1.7 | " |
| B | 12.5 | " |
| Cd | 0.63 – 0.64 | " |
| Cr | 25.0 – 26.0 | " |
| Co | 22.0 – 23.0 | " |
| F | 4.3 – 5.5 | " |
| Hg | 0.09 – 0.11 | " |
| Mg | 1.7 – 1.8 | mg/gm |
| Mn | 92.0 – 95.0 | µg/gm |
| Ni | 18.0 – 19.0 | " |
| Sb | 18.0 – 19.0 | " |
| Se | 1.8 – 2.5 | " |
| V | 6.1 | " |
| Pb | 13.0 – 14.0 | " |
| $Ra^{228}/Th^{228}$ | 1.0 | dpm/gm |
| $Th^{230}$ | 1.3 – 1.4 | " |
| $Th^{232}$ | 1.0 | " |
| $Ra^{226}$ | 0.4 – 0.7 | " |

The ash heavy metal content for the Case 1 and Case 2 operations was assayed as set forth in Table X:

TABLE X

Ash heavy Metal Content (weight %)*

| Metal | Case 1, Southwest Bottom Ash | Case 1, Southwest Fly Ash | Case 2, Midwest Bottom Ash | Case 2, Midwest Fly Ash |
|---|---|---|---|---|
| Be | .0002 | .002 | .0006 | .002 |
| Cd | <.006 | <.006 | <.006 | <.006 |
| As | <.006 | <.006 | <.006 | <.006 |
| V | .01 | .01 | .01 | .03 |
| Mn | .04 | .04 | .03 | .03 |
| Ni | .003 | .003 | .01 | .03 |
| SB | <.006 | <.006 | <.006 | <.006 |
| Cr | .005 | .005 | .02 | .04 |
| Zn | <.006 | <.006 | .005 | .03 |
| Cu | .005 | .005 | .01 | .03 |
| Pb | .004 | .008 | <.002 | .008 |
| B | .01 | .02 | .03 | .1 |
| Li | .02 | .02 | .002 | .004 |
| Ag | <.0002 | .0002 | <.0002 | .0004 |
| Sn | <.002 | .002 | <.002 | .002 |
| Bi | <.002 | <.002 | <.002 | <.002 |
| Co | .002 | .002 | .001 | .005 |
| Mo | .002 | .004 | .0006 | .03 |
| Ti | .4 | .4 | .3 | .5 |
| Zr | .01 | .02 | .003 | .01 |

*(multiply by $10^4$ for values in ppm)

AGGLOMERATION

The treatment of the mixed cake plus ash (solids material) is subject to several options relating to agglomerating. The powdered solids material may be agglomerated, which is used as a generic term to cover both pelleting and briquetting. Pellets may be formed with or without the use of binders, or the mixed solids may be compacted as by a briquetting machine or press, with or without the use of binders. The pelleting operation may employ pan, cone or drum type pelletizers.

The residual solids (sulfate cake) from the wet or dry $SO_x$ emissions control process can be used alone where it contains fly ash, or is mixed with additional fly ash from any ash pre-cleaning operations, such as an electrostatic precipitator or cyclone used (upstream of the baghouse or wet scrubber) to clean a portion of the fly ash from the flue gas prior to the $SO_x$ removal system. The cake (or cake plus fly ash) may also be mixed with bottom ash, in granular or pre-ground powdered form, either dry or with moisture (as withdrawn from the hydrobin or ash bin) mixed therewith.

The pellets or briquettes can be homogenous in composition, either the cake composition throughout or the cake plus fly and/or bottom ash mixture throughout, or the agglomerate pellet or briquette can be layered. For example, spent cake material can be fed into a rotary pan pelletizer with a small amount of moisture or binder to form a pellet of size 1/16th to 3/8th inch in diameter (a seed pellet) and sintered as such or the seed can be pelletized still further with a pure fly ash, bottom ash (ground to finely divided state), or coal, outer layer formed thereon to a larger diameter. Likewise, the briquetting can be done in a series of operations in which a small pellet is formed which is then overcoated with fly ash and briquetted to a larger size. Powdered coal may be mixed with ash and cake, and provides heat for sintering.

To improve homogeneity, pellets or briquettes once formed can be fractured or crushed and re-pelleted or briquetted. Since the sodium sulfur oxides are soluble in water, moisture is a suitable binder for pelletizing or briquetting, i.e., the pellets are self-binding. A variety of conventional binders, such as "parawax" in small amount, typically 0.01 to 10% of the combined spent cake and fly or bottom ash mixture, can be used. Other binders include water soluble natural gums such as gum arabic, gum tragacanth, gum guar, locust bean gum, algins; water soluble starches, starches, starch derivatives and dextrins; water soluble natural or synthetic resins (high polymers) such as polyvinyl alcohol polymers, acrylics, sodium carboxymethyl cellulose, methyl cellulose, hydroxy ethyl cellulose, hydroxy methyl cellulose, polyethylene glycol; water soluble wax emulsions such as acrylic wax emulsions; petroleum waxes; synthetic waxes such as stearates, oleates; water dispersible lignosulfonates which include sodium lignin sulfonate, ammonium lignin sulfonate, calcium lignin sulfonate, waste paper plant liquors containing lignin and lignin derivatives; and organic solvent soluble binders such as synthetic waxes (amides), parawax (paraffin), Carnauba wax, embedding wax, beeswax, and Carbowax. Soft coal, or partially liquefied or solvent refined coal can act as a binder.

The agglomerated material may be any shape, e.g., generally spherical, cylindrical, discoid, tabular, tubular, prismatic, etc. A suitable form that permits rapid heating is tubular, which may be formed by mixing the ash and cake with from 2–15% by weight water (with or without binders) or 1–20% by weight of a hardner such as limestone, dolomite, lime, calcium hydroxide, portland cement, ball clay, etc., and extruding, pressing or forming the tube form, which is let dry and then sintered. A good composition that is formable yet sets to an integral, handleable, hard product, with a density of 1.2 g/cc is 50 weight % Case 1 fly ash, 50 weight % Case 1 (Batch A) cake mixed with 10 weight % water. Another is 40/40 Case 1 ash/cake, 20 weight % lime and 10 weight % water. A third is 23.8/71.8 ash/cake with a 4.0 weight % portland cement and 7.8 weight % water, setting to a hard structure of density 1.3 g/cc. A 15/45 cake/ash mix with 40 weight % dolomite and 7.9% water was a little crumbly but otherwise handleable. A 71.1/26.9 cake/ash mix with 2 weight % lime and 7 weight % water set very hard with a density of 1.5 g/cc. A 47.5/47.5 mix of Case 2 cake and ash with 5 weight % lime and 5 weight % water also set very hard. A 45/45/10/8 mix of the same materials set very hard with a density of 1.6 g/cc.

SPECIFIC EXAMPLES

The batch compositions of sintered samples of Batches A and B, Cases 1 and 2, are listed in Table XI. These include some compositions, called balanced compositions, selected to provide a blend of power plant by-products in the same ratios as produced by the plants of Cases 1 and 2 above. These balanced compositions show disposal by a single sintering method of all the wastes, both ash types, and the $SO_x$ emissions control wastes, from a plant.

Fifty gram batches of the ingredients indicated in Table XI were carefully weighed out and then dry-mixed by tumbling in glass jars on a small roller mill. The bottom ash was preground (ball milled) to a finely divided state on the order of 66-95% −20 mesh. The fly ash as received was 91.5-95% −20 mesh. Three weight % parawax was dissolved in 97 cc of trichloroethylene and added by wet mixing, to serve as a binder. After drying at 200°F, at least five 3/4-inch diameter by approximately 3/4-inch-long cylindrical briquette samples were cold-pressed in a steel die at a pressure of 5000 psi. Sintering experiments were performed by heating the briquettes to 1600°, 1700°, 1800°, 1900°, 2000°, and 2100°F for 1 hour in air in an electric globar furnace. Briquettes representing several experimental compositions were sintered during each heating cycle.

Visual observations were made of the sintered condition. Sintered mass density measurements were made by xylene displacement methods; powder tap and green densities were also obtained for selected samples by conventional techniques.

The sintering temperatures and visual observations for sintered samples are listed in Table XI. No difficulty was experienced in fabrication of any selected composition into a strong, uniform pellet. The sintered densities of the pellets were dependent on the sintering temperature for a particular composition. Maximum densification was considered desirable, as was retention of the pellet shape. Slumping or melting of the sample was considered unacceptable as sticking to equipment during in-plant processing could result. Bulk densities of 1.9-2.2 were obtainable for most sintered compositions without excessive sample deformation, and the maximum was about 2.3. Since the compositions were not melted, no phase separation problem was encountered. No adsorption of atmospheric moisture was observed.

It appears that up to all of the sulfate cake produced by a given $SO_x$ emissions control process could be incorporated in the mixture for disposal. For example, sinter samples E, F, RE and RF, which contain a balance of by-product materials observed to be produced by the Southwest and Midwest power plants, successively incorporated all the sulfate cake in the ash-cake mixtures produced, respectively, at those plants. This means all the $SO_x$ emissions control wastes can be insolubilized and disposed of in a single process, along with the ash.

TABLE XI

| Composition Example | Batch A, 1 sulfate cake, wt.% | Sintering Runs (all runs 1 hour) Case 1 Ash Bottom Ash wt. % | Fly Ash wt. % | Max. Sintering Temperaure degrees, F |
|---|---|---|---|---|
| A-1 | 60 | 40 | — | 1700 |
| 2 | " | " | — | 1800 |
| 3 | " | " | — | 1900 |
| 4 | " | " | — | 2000 |
| 5 | " | " | — | 2100 |
| B-1 | 20 | 80 | — | 1700 |
| 2 | " | " | — | 1800 |
| 3 | " | " | — | 1900 |
| 4 | " | " | — | 2000 |
| 5 | " | " | — | 2100 |
| C-1 | 80 | 20 | — | 1700 |
| 2 | " | " | — | 1800 |
| D-1 | 60 | — | 40 | 1700 |
| 2 | " | — | " | 1800 |
| 3 | " | — | " | 1900 |
| 4 | " | — | " | 2000 |
| 5 | " | — | " | 2100 |
| F-1 | 23.2 | 15.7 | 61.1 | 1700 |
| 2 | " | " | " | 1800 |
| 3 | " | " | " | 1900 |
| 4 | " | " | " | 2000 |
| 5 | " | " | " | 2100 |

| Composition Example | Sintered Mass Bulk Density g/cc | RESULTS Rating of Pellet | Comments |
|---|---|---|---|
| A-1 | 1.3202 | Excellent | Looks slightly segregated |
| 2 | 1.6800 | " | Looks slightly segregated |
| 3 | 2.1352 | " | Larger at bottom than top |
| 4 | 2.1331 | Fair | Larger at bottom than top; very small amount of $Al_2O_3$ on bottom |
| 5 | 2.2139 | Poor | Round ball (2%) $Al_2O_3$ on sample |
| B-1 | 1.3394 | Excellent | Small hole one side (brown) |
| 2 | 1.3118 | " | Brown color |
| 3 | 1.2808 | " | Brown color |
| 4 | 1.1564 | " | About 8 small holes, brown |
| 5 | 1.8695 | " | Darker color than others; small amount of $Al_2O_3$ stuck to it |
| C-1 | 1.6491 | Excellent | Excellent |
| 2 | 2.2836 | Fair | Shrank about ¼; very small amount of $Al_2O_3$ on bottom |
| D-1 | 1.3511 | Excellent | Very slightly segregated |
| 2 | 1.6702 | " | Light color |
| 3 | 2.1086 | " | Bottom larger than top |

TABLE XI-continued

| | | Sintering Runs (all runs 1 hour) | | |
|---|---|---|---|---|
| 4 | 2.0449 | Fair | Leaned to one side | |
| 5 | 2.1210 | Poor | Almost a ball; a small amount of Al₂O₃ stuck to pellet | |
| F-1 | 1.3439 | Excellent | Balanced composition, excellent | |
| 2 | 1.3233 | " | Balanced composition, excellent | |
| 3 | 1.3070 | " | Balanced composition(chipped edge) | |
| 4 | 1.6354 | " | Balanced composition, excellent | |
| 5 | 1.9676 | " | Balanced composition, excellent | |

| Composition Example | Batch A, 2 sulfate cake, wt.% | Case 2 Ash Bottom Ash wt. % | Fly Ash wt. % | Max. Sintering Temperature degrees, F |
|---|---|---|---|---|
| E-1 | 71.0 | 8.6 | 20.4 | 1700 |
| 2 | " | " | " | 1800 |
| 3 | " | " | " | 1900 |
| G-1 | 60 | — | 40 | 1700 |
| 2 | " | — | " | 1800 |
| 3 | " | — | " | 1900 |
| 4 | " | — | " | 2000 |
| 5 | " | — | " | 2100 |
| H-1 | 60 | 40 | — | 1700 |
| 2 | " | " | — | 1800 |
| 3 | " | " | — | 1900 |
| I-1 | 80 | — | 20 | 1700 |
| 2 | " | — | " | 1800 |
| 3 | " | — | " | 1900 |
| J-1 | 80 | 20 | — | 1700 |
| 2 | " | " | — | 1800 |
| 3 | " | " | — | 1900 |

| Composition Example | Sintered Mass Bulk Density g/cc | Rating of Pellet | RESULTS Comments |
|---|---|---|---|
| E-1 | 2.0069 | Excellent | Balanced composition; about ¾ original size |
| 2 | — | Poor | Balanced composition; melted; Al₂O₃ stuck to bottom |
| 3 | — | Poor | Balanced composition; melted; Al₂O₃ stuck to bottom |
| G-1 | 2.0289 | Excellent | About ¾ original size |
| 2 | 2.1359 | " | About ¾ original size |
| 3 | 2.0625 | " | about ½ original size |
| 4 | — | Fair | About ½ original size; Al₂O₃ stuck to bottom |
| 5 | — | Poor | Melted |
| H-1 | 2.1711 | Excellent | Looks segregated |
| 2 | — | Poor | Melted, Al₂O₃ stuck to bottom |
| 3 | — | Poor | Melted, Al₂O₃ stuck to bottom |
| I-1 | 1.9805 | Excellent | About ¾ original size |
| 2 | — | Poor | Melted, Al₂O₃ stuck to bottom |
| 3 | — | Poor | Melted, Al₂O₃ stuck to bottom |
| J-1 | 2.1170 | Excellent | Looks segregated |
| 2 | — | Poor | Melted, Al₂O₃ stuck to bottom |
| 3 | — | Poor | Melted, Al₂O₃ stuck to bottom |

| Composition Example | Batch B, 1; Run 1 Sulfate Cake, wt.% | Case 1 Ash Bottom Ash wt. % | Fly Ash wt. % | Powder Tap Density g/cc | Green Density g/cc |
|---|---|---|---|---|---|
| RA-1 | 60 | 40 | — | .908 | 1.4760 |
| 2 | " | " | — | " | 1.4900 |
| 3 | " | " | — | " | 1.485 |
| RD-1 | 60 | — | 40 | .750 | 1.434 |
| 2 | " | — | " | " | 1.404 |
| 3 | " | — | " | " | 1.459 |
| RF-1 | 23.2 | 15.7 | 61.1 | .831 | 1.437 |
| 2 | " | " | " | " | 1.438 |
| 3 | " | " | " | " | 1.435 |

| | Batch B, 2 | Case 2 Ash | | | |
|---|---|---|---|---|---|
| RE-1 | 71.0 | 8.6 | 20.4 | .950 | 1.578 |
| 2 | " | " | " | " | 1.572 |
| 3 | " | " | " | " | 1.576 |
| 4 | " | " | " | " | 1.585 |
| RG-1 | 60 | — | 40 | .846 | 1.580 |
| 2 | " | — | " | " | 1.569 |
| 3 | " | — | " | " | 1.570 |
| 4 | " | — | " | " | 1.582 |
| RH-1 | 60 | 40 | — | 1.033 | 1.672 |
| 2 | " | " | — | " | 1.681 |
| 3 | " | " | — | " | 1.687 |
| 4 | " | " | — | " | 1.662 |

| Composition Example | Temp. °F | Sintered Mass Bulk Density g/cc | Rating of Pellets | RESULTS Comments |
|---|---|---|---|---|
| RA-1 | 1800 | 1.542 | Excellent | Excellent, very little cracking, grey |
| 2 | 1900 | 1.765 | " | Excellent, very small |

TABLE XI-continued

Sintering Runs
(all runs 1 hour)

| | | | | |
|---|---|---|---|---|
| 3 | 2000 | 2.002 | " | cracks, grey |
| | | | | Excellent, grey |
| RD-1 | 1800 | 1.627 | Excellent | Excellent, grey |
| 2 | 1900 | 1.724 | " | Excellent, grey |
| 3 | 2000 | 2.004 | " | Excellent, grey |
| RF-1 | 1900 | 1.235 | Excellent | Excellent, grey |
| 2 | 2000 | 1.440 | " | Excellent, grey |
| 3 | 2100 | 1.913 | " | Excellent, color varies brown to grey |
| RE-1 | 1600 | 1.956 | Excellent | Small crack at one side, brown |
| 2 | 1700 | 2.090 | " | Cracking at one end, brown |
| 3 | 1800 | 1.612 | Fair | 2 pits on one side, brown |
| 4 | 1900 | 1.524 | Poor | Extensive pitting, brown |
| RG-1 | 1600 | 2.027 | Excellent | Small cracks around circumstances |
| 2 | 1700 | 2.172 | " | Cracking at one end |
| 3 | 1800 | 1.419 | Fair | Large cracks at one side, brown |
| 4 | 1900 | 1.262 | Poor | Some melting, brown |
| RH-1 | 1600 | 1.923 | Excellent | Small cracks at one side |
| 2 | 1700 | 1.855 | Fair | Melted on one side, dark grey |
| 3 | 1800 | 1.4418 | Fair | Cracking on one side, brown |
| 4 | 1900 | 1.433 | Poor | Some melting, brown |

Pellet rating of fair or poor is an indication that the sintering temperature was on the high side, and the pellet tended toward a melted condition. Since the major cost of pellet production will undoubtedly be heat costs, the lower the temperature of sintering of the pellet, the better. The pellet ash-cake compositions have a specific heat in the range of from about 0.35 to 0.50 BTU/lb-°F. On a commercial scale, the sintering of pellets or briquettes can be done in conventional equipment, such as a moving grate (belt) or a vertical shaft kiln.

We prefer a coal-fired, vertical shaft kiln with a top feed of green or pre-sintered pellets and bottom feed of air. The thermal efficiency of this operation would range from about 50–60% as compared to 25% for a grate. Where natural gas is available as fuel, it is preferred over coal since the thermal efficiency can range to 80%. However, gas scarcity and availability of cheap coal at the mine-mouth type power plant makes coal the presently preferred fuel. An alternative is to gasify coal in a Lurgi or other type gasifier, and optionally methanate the gas (as by water gas shift), and feed this gas to the shaft kiln. Powdered coal-containing pellets or briquettes may also be fired on a grate or shaft kiln.

Heat energy from the off-gas from the shaft kiln can be recovered, or used to preheat and pre-oxidize the sulfite values in the pellets or dry wet scrubber liquors or sludges. The gases can then be combined with the power plant flue gas for $SO_x$ and particulates scrubbing. In the alternative, the shaft kiln flue gas can be passed through a particulates scrubber (e.g., an electrostatic precipitator) and the $SO_x$-containing gas can be forwarded to a sulfuric acid plant. This would be particularly suitable in smelter operations. For Case 2 above, a shaft kiln burning the same coal at 55% efficiency will require about 125,000 TPY coal and produce approximately 11,000 TPY additional ash. Incorporating this ash in the agglomerates is beneficial since dilution of the cake with added ash makes for a more stable agglomerate from the point of view of solubility and gassing, i.e., leads to reduced solubility and less degassing. Heat recovered from molten bottom ash may be used to reduce kiln fuel needs, or dry the cake.

In off-gas tests of sintering at 2100°F, a substantial portion of cake sulfite evolved as $SO_2$, as shown by peroxide collection and titration. Gas evolution was reduced by lowering the sintering temperature to 1700°F. The same composition with sulfate content equivalent to sulfite, representing oxidative conversion to sulfate, at 1700°F reduces $SO_2$ evolution to less than 1% (.7%). At lower sintering temperatures, 900°–1200°F, sulfite evolution will be still lower.

Sintering temperatures can be reduced by admixture of certain fluxing agents such as borates (e.g., up to 5%), glassmakers grade limestone (e.g., 1–30%), potters flint (1–15%) and the like. Limestone addition is preferred, and may result in lowering sintering temperatures about 25°–150°F from the 1400°–1800°F range, for additions on the order of 2–25%. For example, two typical compositions are: 63.9 wt % Batch B Case 2 cake, 7.7% Case 2 bottom ash, 18.4% Case 2 fly ash, 10% limestone; and 53.3% cake, 6.4% bottom ash, 15.3% fly ash, and 25% limestone. Certain demineralizer wastes from nuclear power plants are high in borates, providing an excellent source of borate flux for the cake-ash compositions.

Representative samples of pellets from the sintering runs were selected for leaching experiments. The procedure used in leaching experiments was the following. The cooled sintered samples were placed in individual pyrex beakers with 100 milliliters of deionized water, covered with watch glasses to minimize evaporation, and magnetically stirred. Samples of the liquid were drawn at 1, 10, 100, and 1,000 hours for chemical analysis of the sodium concentration as a means of determining the leaching rate. The water level was periodically restored to the initial condition, but no compensation was made for the effect of compositional alteration as leaching proceeded. This is considered to represent very harsh landfill conditions, which would rarely, if ever, involve total immersion in water for an extended period of time with vigorous turbulence or flow (as simulated by the stirring).

The leaching test results for selected sintered samples from Table XI are shown in Table XII below:

TABLE XII

Results of Leaching Experiments on Sintered Samples

| Example | Sintering Temperature | Bulk Density (g/cc) | Sample Weight (gram) | Sodium Concentration[1] (mg/ml) After Indicated Hours | | | |
|---|---|---|---|---|---|---|---|
| | | | | 1 | 10 | 100 | 1000 |
| A-3 | 1900 | 2.1352 | 1.0054 | 0.055 | 0.088 | 0.263 | 0.133 |
| D-3 | 1900 | 2.1086 | 1.5918 | 0.636 | 0.738 | 0.823 | 0.713 |
| E-1 | 1700 | 2.0069 | 1.1981 | .21 | .395 | .504 | * |
| F-5 | 2100 | 1.9676 | 1.9597 | .001 | 0.0 | .004 | * |
| G-2 | 1800 | 2.1359 | 2.8241 | .87 | 1.625 | 2.264 | * |
| H-1 | 1700 | 2.1711 | 1.6191 | .23 | .555 | .864 | * |

[1] Corrected for blank determinations
*Samples in essentially the same condition at 1000 hrs of leach testing as at 100 hrs.

The sintered agglomerate of this invention showed that the sodium sulfate solubility can be reduced, to less than the currently-accepted standard, by sintering with ash. That is, the sodium sulfate solubility was reduced, typically, to less than that of calcium sulfate, 2.3 grams per liter at room temperature. In general, the solubility of sodium sulfate was reduced $10^3$ to $10^4$ times, and thus the sintered pellets or briquettes represent extremely good materials which can be landfilled or otherwise disposed of by conventional methods.

The standard in the industry is the solubility of $CaSO_4 \cdot 2H_2O$, which is 2.3 g/l at room temperature. In contrast, $MgSO_4 \cdot 7H_2O$ has a solubility of 710 g/l. $Na_2SO_4$ (Thernardite) has a solubility of 47.6 g/l at 0°C and 427 g/l at 100°C, while monoclinic columnar $Na_2SO_4$ is 488 g/l at 40°C. $Na_2SO_4 \cdot 7H_2O$ has a solubility of 195 g/l at 0°C, while Glauber's salt, $Na_2SO_4 \cdot 10H_2O$ has a solubility of 111 g/l at 0°C. $Na_2SO_3 \cdot 7H_2O$ has a solubility of 328 g/l at 0°C while anhydrous $Na_2SO_3$ has a solubility of 125.4 g/l at 0°C. Thus, reduction in the solubility of the sodium sulfur oxides (or their fixing) to the level of calcium sulfate solubility, amounts to a reduction in solubility of about two order of magnitude, $10^2$. This goal was achieved, or exceeded by up to two more orders of magnitude.

The heavy metals appear to be bound into the sinter matrix. Analyses showed that there was almost a total absence of heavy metal components in the leachate solution at the end of 1,000 hours. Similarly, radioactive metallic elements may be bound into the matrix, thus reducing their leaching potential.

Concrete mixes may contain the pellets or briquettes of this invention, or they may be used as grog in ceramic or brick compositions. A typical concrete mix would be 4 parts sintered agglomerates of mixed size ranging from small 1/8⅛ × 1/8⅛ pellets to large 1⅛ × 2⅛ briquettes in the ratio of 75% large to 25% small, 1 part sand, and 1 part portland cement. Standard mixes, with sintered briquettes in place of coarse or medium aggregates, of 1:2:2¼, or 1:2½:3½, or 1:3:4 (cement:sand:sintered agglomerate aggregate) may be used.

While we do not wish to be bound by theory, we believe that sintering in accord with this invention produces a partial melting of the surface of the ash particles under the influence of the sulfate cake which forms a glassy binding matrix of a type capable of containing high percentages of sodium sulfur oxides in the form substantially fixed or inaccessable to water, and which also serves to fix heavy metals, without forming a true homogeneous glass, and without loss of sulfur values as a gas. This is considered unexpected in view of the fact that glass cannot contain more than about 1–4% sodium sulfate without a tendency to phase separate or become water soluble.

It should be understood that various modifications within the scope of this invention can be made by one of ordinary skill in the art without departing from the spirit thereof. We therefore wish our invention to be defined by the scope of the appended claims as broadly as the prior art will permit, and in view of this specification if need be.

We claim:

1. A water pollution control process for reducing the solubility of alkali metal sulfur oxides industrial process wastes comprising the steps of:
   a. mixing said industrial process waste containing an alkali metal sulfur oxide selected from sodium, potassium, and lithium, sulfite, sulfate, and mixtures thereof, with an effective amount of an alumina and silica-containing ash selected from fly ash, bottom ash, and mixtures thereof to produce a mixture;
   b. forming an agglomerate consisting of individual particles of said mixture;
   c. heating said mixture-containing agglomerate to a temperature within the range of about 1000–2300°F for a time sufficient to sinter said agglomerate into an integral mass while retaining said agglomerate form with a substantial portion of individual agglomerate particles being fused together by a glassy matrix;
   d. said sulfur oxide is in a sulfite state, a sulfate state, or a mixture of said states in amounts selected to produce no substantial degassing as $SO_x$, where x is selected from 2 or 3, of the sulfur oxide of said sulfur oxide component at said temperature;
   e. said amount of ash in said mixture being effective in producing an agglomerated-sintered mass exhibiting about two orders of magnitude lower water solubility of said alkali metal sulfur oxide component incorporated therein, measured as said alkali metal, as compared to the solubility of said alkali metal sulfur oxide in an unincorporated state.

2. A process as in claim 1 wherein said process waste is selected from a waste produced in an $SO_x$ emissions control process, a sodium sulfite or sulfate water pollution control process, a water demineralization process, a paper-making process, and mixtures of said wastes.

3. A process as in claim 2 wherein said water demineralization process wastes includes wastes from processes for:
   a. demineralizing feed or waste waters used in or produced by industrial or power plant operations,
   b. demineralizing cooling tower blowdown streams, and
   c. decontamination of rad wastes containing radioactive heavy elements from nuclear processes, and said elements are substantially fixed in said sintered mass.

4. A process as in claim 2 wherein said process waste is produced in an $SO_x$ emissions control process employing wet or dry scrubbing of a process off-gas or flue gas with a sodium alkali selected from sodium hydroxide, sodium bicarbonate, sodium carbonate, Nahcolite Ore, Trona, sodium sulfite, sodium bisulfite, a molten alkali metal carbonate and mixture of carbonates, and mixtures thereof.

5. A process as in claim 4 wherein said sodium alkali is selected from sodium bicarbonate and Nahcolite Ore employed in a dry-type $SO_x$ emissions control process.

6. A process as in claim 1 wherein said ash includes ash resulting from the burning of a fossil fuel.

7. A process as in claim 6 wherein said fossil fuel is coal.

8. A process as in claim 7 wherein said process waste is produced in an $SO_x$ emissions control process employing wet or dry scrubbing of a process off-gas or flue gas with a sodium alkali selected from sodium hydroxide, sodium bicarbonate, sodium carbonate, Nahcolite Ore, Trona, sodium sulfite, sodium bisulfite, a molten alkali metal carbonate and mixture of carbonates, and mixtures thereof.

9. A process as in claim 8 wherein said sodium alkali is selected from sodium bicarbonate and Nahcolite Ore employed in a dry-type $SO_x$ emissions control process.

10. A process as in claim 1 wherein said ash contains heavy metals, and said heavy metals are substantially fixed in said sintered mass.

11. A process as in claim 1 wherein said temperature is in the range of from 1200°–1800°F.

12. A process as in claim 11 wherein said temperature is in the range of from 1400°–1800°F.

13. A process aas in claim 4 wherein said temperature is in the range of from 1200°–1800°F.

14. A process as in claim 5 wherein said temperature is in the range of from 1400°–1800°F.

15. A process as in claim 8 wherein said temperature is in the range of from 1200°–1800°F.

16. A process as in claim 6 wherein said temperature is in the range of from 1200°–1800°F.

17. A process as in claim 1 wherein said agglomerate formation step is selected from pelleting and briquetting.

18. A process as in claim 17 wherein said agglomerate formation step includes the step of addition to said mix of an agglomerate aid selected from water, a binder, and mixtures thereof.

19. A process as in claim 18 wherein said temperature is in the range of from 1200°–1800°F.

20. A process as in claim 1 wherein said agglomerate includes an additive for lowering said sintering temperature.

21. A process as in claim 20 wherein said additive is selected from a boron fluxing compound, and limestone.

22. A process as in claim 1 wherein said agglomerate includes powdered coal.

23. A process as in claim 1 wherein said agglomerate contains particle layers and the ratio of process waste to ash varies from layer to layer in said agglomerate.

24. A process as in claim 23 wherein said agglomerate particles have an interior zone and at least one layer lying outwardly thereof, and the percentage of ash in said outer layer of said agglomerate is greater than in said interior.

25. A process as in claim 1 wherein said ash includes ash resulting from burning of coal and said ash is selected from fly ash, bottom ash and mixtures therof.

26. A process as in claim 25 wherein said process waste is produced in an $SO_x$ emissions control process employing wet or dry scrubbing of a process off-gas or flue gas with a sodium alkali selected from sodium hydroxide, sodium bicarbonate, sodium carbonate, Nahcolite Ore, Trona, sodium sulfite, sodium bisulfite, a molten alkali metal carbonate and mixture of carbonates, and mixtures thereof.

27. A process as in claim 26 wherein said temperature is within the range of 1200°–1800°F.

28. A process as in claim 1 which includes the step of:
 a. converting at least a portion of said sulfite to sulfate.

29. A process as in claim 28 wherein said conversion includes conversion in the presence of water.

30. A process as in claim 28 wherein at least a portion of said conversion is effected prior to said heating.

31. A process as in claim 30 wherein at least a portion of said conversion is effected during said agglomerate formation.

32. A process as in claim 28 wherein at least a portion of said conversion is effected during said heating.

33. A process as in claim 15 wherein said heating is effected in a shaft kiln.

34. A process as in claim 33 wherein said shaft kiln is heated by powdered coal and produces a flue gas.

35. A process as in claim 34 wherein heat energy and $SO_x$ are recovered from said flue gas.

36. A process as in claim 1 wherein said heating is effected in a shaft kiln.

37. A process as in claim 28 wherein said heating is effected in a shaft kiln.

38. A process as in claim 15 wherein said mixture is balanced with respect to said fly ash, bottom ash, and $SO_x$ emissions control waste.

* * * * *

UNITED STATES PATENT AND TRADEMARK OFFICE
CERTIFICATE OF CORRECTION

PATENT NO. : 3,962,080
DATED : June 8, 1976
INVENTOR(S) : Dulin et al.

It is certified that error appears in the above—identified patent and that said Letters Patent are hereby corrected as shown below:

Column 5, line 37, please delete the comma after "electrostatic"

Column 9, line 35 (Table IV), please change the first occurrence of "840" to --800--

Column 13, line 33, please change "SB" to --Sb--

Column 21, line 50, please change the phrase "1/8½ x 1/8½" to read --1/8" x 1/8"--

Column 21, lines 51 and 52, please change the phrase "1½ x 2½" to --1" x 2"--

Column 22, line 35, after "particles" please insert --including a portion--

Signed and Sealed this

Fourteenth Day of September 1976

[SEAL]

Attest:

RUTH C. MASON
*Attesting Officer*

C. MARSHALL DANN
*Commissioner of Patents and Trademarks*